United States Patent [19]

Abe et al.

[11] Patent Number: 5,187,870
[45] Date of Patent: Feb. 23, 1993

[54] GYRO COMPASS

[75] Inventors: Atsushi Abe, Suita; Yoshio Sakai, Kobe, both of Japan

[73] Assignee: Furuno Electric Company, Limited, Hyogo, Japan

[21] Appl. No.: 905,201

[22] Filed: Jun. 26, 1992

Related U.S. Application Data

[63] Continuation of Ser. No. 613,870, Dec. 5, 1990, abandoned.

[30] Foreign Application Priority Data

Apr. 14, 1989 [JP] Japan .................................. 1-95854

[51] Int. Cl.[5] ............................................. G01C 19/38
[52] U.S. Cl. .......................................................... 33/324
[58] Field of Search .................... 33/324, 326, 320, 322, 33/318, 325; 74/5 R

[56] References Cited

U.S. PATENT DOCUMENTS

| 3,371,542 | 3/1968 | Swarts et al. | 33/318 |
| 3,461,568 | 8/1969 | Kawada | 33/324 |
| 3,522,736 | 8/1970 | Takeshi | 77/5 R |
| 3,938,256 | 2/1976 | Crocker | 33/324 |
| 4,379,365 | 4/1983 | Rietmüller et al. | 33/324 |
| 4,443,952 | 4/1984 | Schulien et al. | 33/324 |
| 4,461,089 | 7/1984 | Krogmann | 33/324 |
| 4,603,483 | 8/1986 | Wing | 33/324 |
| 4,622,646 | 11/1986 | Waller et al. | 33/326 |
| 4,686,771 | 8/1987 | Beveventano et al. | 33/324 |

FOREIGN PATENT DOCUMENTS

| 2131502 | 1/1973 | Fed. Rep. of Germany | 33/324 |
| 2263338 | 6/1974 | Fed. Rep. of Germany | 33/318 |
| 3228027 | 2/1984 | Fed. Rep. of Germany | 33/324 |
| 47-6343 | 2/1972 | Japan . | |
| 0163509 | 9/1984 | Japan | 33/324 |
| 0261009 | 11/1987 | Japan | 33/324 |
| 0088310 | 4/1989 | Japan | 33/324 |
| 2124372 | 2/1984 | United Kingdom | 33/324 |

Primary Examiner—William A. Cuchlinski, Jr.
Assistant Examiner—Alvin Wirthlin

[57] ABSTRACT

A gyro compass according to the present invention includes an inclinometer for detecting inclination of the spin axis of a rotor with respect to the earth's surface, a horizontal axis torque applying device for exerting a torque about the horizontal axis of the rotor, a vertical axis torque applying device for exerting a torque about the vertical axis of the rotor, and an equilibrium tilt angle storing device for storing an inclination angle of the rotor while the gyro compass is in the equilibrium state. An inclination adjustment controlling device for adjusting an inclination angle stored of the rotor to the inclination angle in the equilibrium state by controlling the vertical axis torque applying device.

14 Claims, 5 Drawing Sheets

GYRO COMPASS

This application is a continuation of application Ser. No. 07/613,870 filed on Dec. 5, 1990, now abandoned.

TECHNICAL FIELD

The present invention relates to a gyro compass which has improved its short-time settling capability.

BACKGROUND ART

In general, a gyro compass causes the gyro rotor to precess depending on the rate of the Earth's rotation to seek the north. In its normal operation precession is produced depending on a vector component of the rate of the Earth's rotation about the true vertical and the other vector component of the rate of the Earth's rotation about the north/south horizontal at a latitude on the Earth's surface to stably point the spin axis of the rotor to the north.

However, if the spin axis of the rotor is deviated from the north, or the inclination angle of the spin axis of the rotor with respect to the Earth's surface is departed from an inclination angle thereof in the equilibrium state when the gyro compass is started to be driven, precession is caused to be produced due to a vector component of the rate of the Earth's rotation about the north/south horizontal and the other vector component of the rate of the Earth's rotation about the true vertical so that the north seeking end of the axis of the rotor draws an elliptical trace and is brought to point an equilibrium direction a long time after the compass is started. During a time period from an instant at which the gyro compass is started to another instant at which it is brought to an equilibrium state, a bearing can not be measured precisely. Accordingly, this time period for stabilization should be made as short as possible.

DISCLOSURE OF INVENTION

An object of the present invention is to provide a gyro compass which is capable of greatly improving a short-time settlement capability.

A first feature of a gyro compass according to the present invention is that the gyro compass comprises an inclinometer for detecting an inclination of the spin axis of the rotor with respect to the Earth's surface, a horizontal-axis torque applying device for exerting a torque about the horizontal axis of the rotor, a vertical-axis torque applying device for exerting a torque about the vertical axis of the rotor, an automatic rotor raising control means for raising the rotor to a horizontal plane controlled by the vertical-axis torque applying device at a first stage after the rotor is started to be driven, and a short-time settlement control means for settling the rotor in a short time by obtaining angular inclination velocity based on output signals of the inclinometer at a second stage and by controlling the horizontal-axis torque applying device and the vertical-axis torque applying device in correspondence to the angular inclination velocity.

A second feature of a gyro compass according to the present invention is that a gyro compass comprising a tilt-meter for detecting a tilt of the rotor axis with respect to the Earth's surface, a horizontal-axis torque applying device for exerting a torque about the horizontal axis of the rotor, a vertical-axis torque applying device for exerting a torque about the vertical axis of the rotor, an automatic rotor raising control means for raising the rotor to a horizontal plane controlled by the vertical-axis torque applying device at a first stage after the rotor is started to be driven, and a short-time settlement control means for settling the rotor in a short time by obtaining angular tilt velocity based on output signal of the tiltmeter at a second stage and by controlling the horizontal-axis torque applying device and the vertical-axis torque applying device in correspondence to the angular tilt velocity, further comprises an equilibrium tilt angle storing means for storing a tilt angle of the rotor when the gyro compass is in an equilibrium state and a tilt adjusting control means for adjusting the tilt angle of the rotor to the tilt angle of the rotor in the equilibrium state by controlling the vertical-axis torque applying device at a third stage.

With regard to the first feature of a gyro compass according to the present invention, the following controls from a first stage through a fourth stage will be performed after the rotor of the gyro compass is started to be driven. First stage(automatic raising):

A pointing direction of the horizontal-axis of the rotor is detected in response to output signals of the tiltmeter immediately after the rotor is started to be driven. Deviation error signals are given to a follow-up servo to twist a suspension wire, thereby precessing the rotor about the horizontal axis thereof to raise the rotor to a horizontal plane.

Second stage (short-time settlement):

A horizontal axis torque applying device (hereinafter called as "torquer" which increases amplification ratio for differential components of output signals of the tiltmeter and exerts a torque about the horizontal axis of the rotor is driven so that oscillating periods are shortened. Also, torques corresponding to a part of differential components of the output signals of the tiltmeter are applied about the vertical axis of the rotor to dampen the oscillations. This operation enables the spin axis of the rotor to be in alignment with a meridian in a short time.

Third stage(tilt adjustment):

At the second stage, the tilt of the rotor is not yet coincident with the tilt angle thereof in an equilibrium state. The tilt angle of the rotor in an equilibrium state is given as follows:

$$\beta = H \cdot \omega \cdot \sin \phi / K p \qquad (1)$$

where
H: Angular momentum of the rotor
$\beta$: Tilt angle
$\omega$: Angular velocity of the Earth's rotation
$\Phi$: Latitude
K p: Ratio of output of the torquer to a tilt angle At this stage, latitude information is obtained from a navigational aid such as a loran receiver or a chart and a tilt angle of the foregoing equation is automatically calculated to give deviation error signals to the follow-up servo so that torques will be exerted about the vertical axis of the rotor to make the tilt of the rotor coincident with the tilt angle thereof.

Fourth stage (normal operation):

As a result of the foregoing operations, the spin axis of the rotor points to the north and the tilt of the rotor is made coincident with the tilt angle thereof in an equilibrium state. Then, output torques of the torquer are made dependent on an appropriate mixture of proportional components and differential components and the amplification ratio in relation to signals supplied to the torquer is lowered to about an 84-minute period and to perform a normal operation of a gyro compass thereafter.

As explained in the foregoing, a gyro compass can be settled in a short time.

The second feature of a gyro compass according to the present invention solves the following problem and brings a gyro compass to the equilibrium state in a shorter time and more precisely.

It is to be noted that the equilibrium tilt angle automatically obtained at the third stage in the foregoing is a theoretical value and is a little different from an equilibrium tilt angle obtained in practice. Reasons for it will be explained hereinafter.

In manufacturing a gyro compass, it is tried to precisely adjust the center of gravity thereof about the horizontal axis to be at a desired point. But, it can not be adjusted with a mathematical precision. Also, it is designed to arrange various components in symmetry with respect to the horizontal axis so that the center of gravity thereof is not displaced due to temperature changes. But, in practice, the center of gravity is a little displaced due to component variations and the like.

A torque exerted about the horizontal axis of the rotor is a total of torques produced in association with the center of gravity and torques produced by the torquer. This total torque is constant, since it is the torque which corresponds to the rotational speed of the earth at a latitude thereof and is necessary to precess the north seeking end of the rotor axis to seek the north. Hence, outputs of the torquer increase or decrease depending on at which point the center of the gravity is.

Outputs of the torquer are controlled to be produced depending on output signals of the tilt meter. Thus, a tilt angle of the rotor in an equilibrium state does not become constant, if outputs of the torquer are not constant as in the foregoing.

As explained, a tilt angle in the equilibrium state does not coincide with a theoretical value precisely. Even if the tilt angle of the rotor is made coincident with a theoretical equilibrium tilt angle at the third stage of short-time settling operation in the foregoing, a slight difference in tilt angle therebetween requires a little more time to reach a precise equilibrium state.

The second feature of the present invention is to provide a gyro compass which solves the foregoing problems by setting an inclination angle of the rotor to coincide with an inclination angle of the rotor obtained when the gyro compass is stabilized at the third stage for performing the short-time settlement operation.

BRIEF DESCRIPTION OF DRAWINGS

FIG.. 3 through FIG. 5 show block diagrams respectively illustrating embodiments of an equilibrium tilt angle storing means for the gyro compass.

EMBODIMENTS

Figure 1:
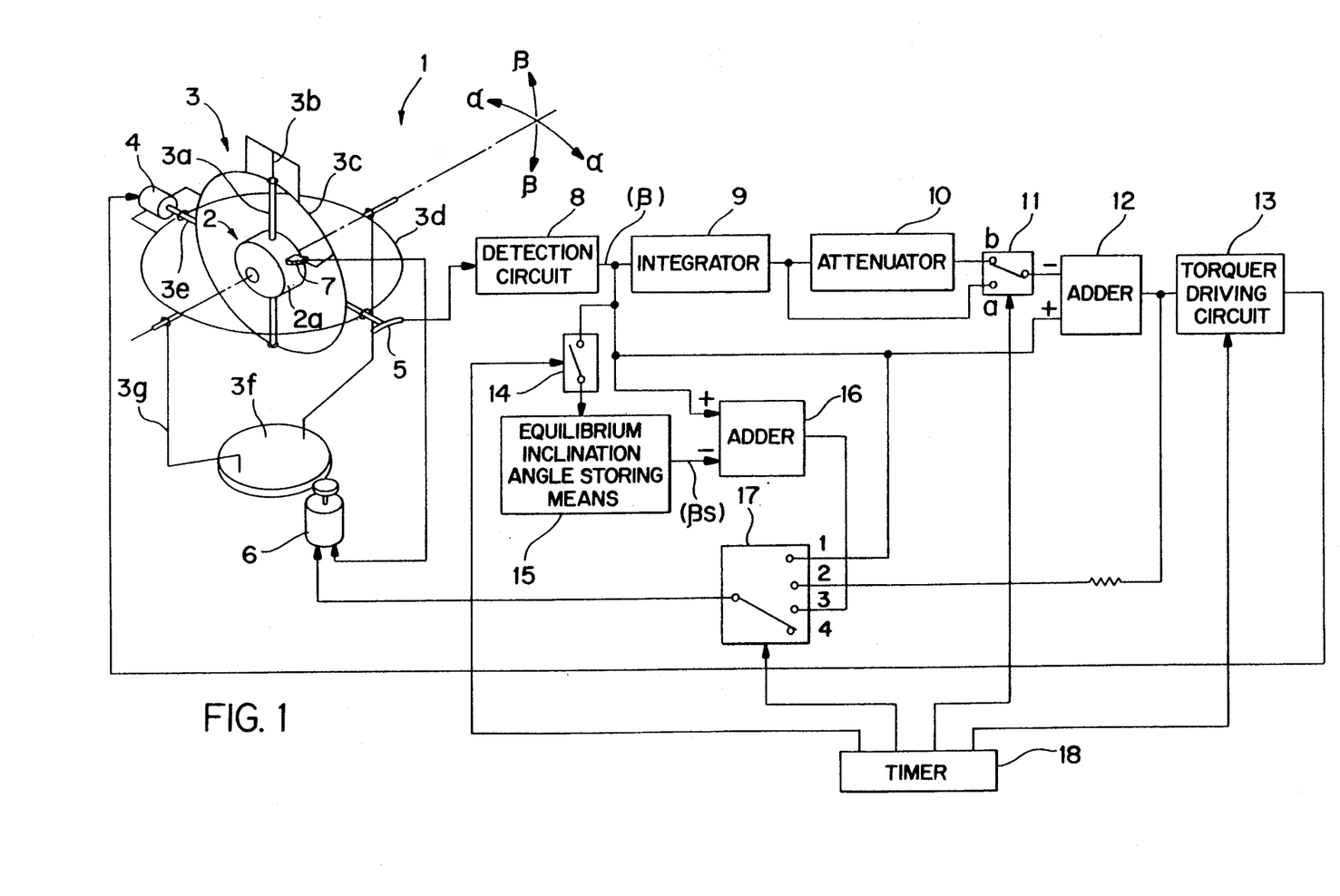
FIG. 1 shows a block diagram of an embodiment of a gyro compass in accordance with the present invention.

Referring to FIG. 1, gyrocompass structure represented by numeral 1" comprises a gyro-rotor 2 and a gymbal 3 supporting the rotor.

The gyro-rotor 2 is suspended in a manner that a container 2a thereof is supported by a vertical shaft 3a and further suspended by a suspension wire 3b.

The vertical shaft 3a and the suspension wire 3b are rotatably journaled in and supported by a vertical ring 3c. The vertical ring 3c is supported with respect to a horizontal ring 3d in a manner that it is rotatable about a horizontal axis 3e. The horizontal ring 3d is rotatably supported by support arms 3g mounted on a follow-up ring 3f.

The horizontal axis 3e supporting the vertical ring 3c is provided with a torquer 4 exerting a torque about the axis and with an inclinometer 5 detecting an inclination of the gyro-rotor axis with respect to the surface of the earth. The follow-up ring 3f is provided with a servo motor 6 for applying a torque about the vertical axis of the gyro-rotor 2 and following up the movement of the gyro-rotor 2.

A follow-up sensor 7 is installed between the vertical ring 3c and the gyro rotor 2. The servo motor 6 is driven in response to detection signals produced by the follow-up sensor 7, thereby causing the follow-up ring 3f to follow the gyro-rotor 2 and also making it possible to detect bearing by means of the gyro compass.

The tiltmeter 5 is provided with an electric circuit which will be explained hereinafter and performs computation processes on output signals of the tiltmeter to control the torquer 4 and the servo motor 6.

A detection circuit 8 produces signals corresponding to tilt angles of the rotor based on output signals produced by the tiltmeter 5. An integrator 9 operates to integrate output signals of the detection circuit 8. A damper 10 decreases output signals of the integrator 9 to produce output signals so that the ratio of an input signal to an output signal thereof becomes a predetermined one. An adder 12 subtracts signal components selected by a switch 11 from output signals of the detection circuit 8. A torquer drive circuit 13 drives a torquer 4 in response to output signals of the adder 12. An equilibrium tilt angle storing means 15 is a device for storing a tilt angle of the rotor after the rotor is brought to an equilibrium state. An adder 16 provides a follow-up servo system with an error signal by subtracting output signals of the equilibrium tit angle storing means 15 from output signals of the detection circuit 8. A timer 18 controls switches 11, 14 and 17 to change the connection of circuits and controls the amplification ratio of the torquer driving circuit 13 to be varied so that controls at the first stage through the fourth stage are successively performed.

The operation of the control system shown in FIG. 1 is performed as follows:

The first stage(automatic raising):

The switch 17 is turned to the tap "1" thereof so that output signal of the detection circuit 8 is coupled to the servo motor 6 to give an error signal to the follow-up servo system. The suspension wire is twisted so that the rotor precesses about the horizontal axis to be raised to a horizontal plane.

The second stage[short-time settlement):

The switch 11 is turned to the tap "a" thereof and the switch 17 is turned to the tap "2" thereof. As a result, at the output terminal of the adder 12 there is produced an output signal obtained by subtracting an integrated value produced by the integrator 9 from an output signal supplied by the detection circuit 8. The integrator 9 and the adder are equivalent to and function as a differentiator. At the output terminal of the adder 12, there will be produced a differential component $(d\beta/dt)$ of a tilt angle of the rotor. A torquer driving circuit 13 drives the torquer 4 in response to the differential component greatly amplified thereby. The amplification ratio is set large independently of 84-minute period (or Schuer period) which shorten oscillating periods. A portion of the differential component is supplied to the servo motor 6. As a result, oscillations are dampened, and the spin axis of the rotor is made aligned with meridian.

The third stage(tilt adjustment):

The switch 17 is turned to another tap "3" thereof so that signals obtained by subtracting output signals "βs" produced by the equilibrium tilt angle storing means 15 from output signals "β" of the detection circuit 8 are supplied to the servo motor 6. Thus, an error signal "βs" is transmitted to the follow-up system. Consequently, the tilt angle of the rotor is brought to be in alignment with a tilt angle thereof corresponding to a vector component of the rate of the Earth's rotation about the true vertical at a latitude on the Earth's surface. Since the equilibrium tilt angle storing means 15 stores an inclination angle of the rotor therein at a time instant when the gyro compass is precisely brought to an equilibrium state, as will be explained hereinafter, in contrast with a prior art apparatus in which the tit angle in the equilibrium state is given according to a theoretical equation (refer to the equation (11), the gyro compass can be precisely brought into an equilibrium state when the operation at the third stage is completed.

The fourth stage(normal operation):

The switch 11 is turned to the other tap "b" thereof so that an output torque of the torquer 4 will be an appropriate mixture of proportional components of the output signal of the tiltmeter 5 and differential components thereof. Further, the amplifying ratio of the torquer driving circuit 13 is decreased, thereby setting the oscillation period as the 84-minute period. Also, the switch 17 is turned to another tap .4 TM so that it operates as a normal gyro compass thereafter.

When the power source of a gyro compass is turned off, the rotor has stopped rotating. The pointing direction and the tilt of the rotational axis of the rotor are different from those in the equilibrium state respectively. In general, the power source of a gyro compass is switched off when a moving body such as a ship provided with a gyro compass comes to anchor and hence the gyro compass is fixed at a point on the Earth's surface. Thus, while the power source of the gyro compass is turned off, latitudes with respect to the ship do not vary. When a gyro compass is exactly in the equilibrium state, for example just before the power source of the gyro compass is switched off, the switch 14 shown in FIG. 1 is closed so that the tilt angle in the equilibrium state is stored in the equilibrium tilt angle storing means 15. After the gyro compass is started to be driven, the tilt angle of the rotor is directly controlled by output signals of the tilt angle storing means 15.

Figure 2:
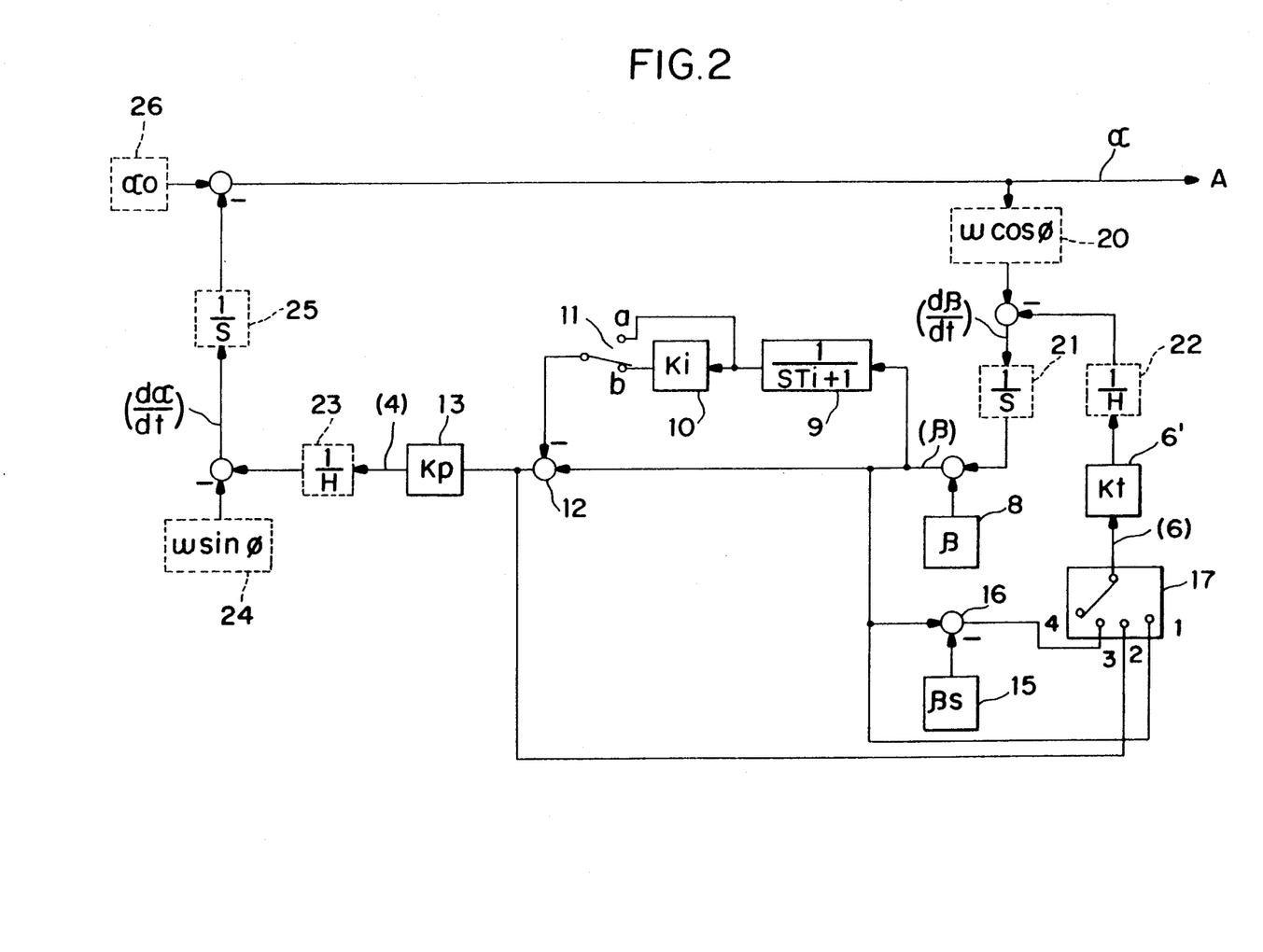
FIG. 2 is a block diagram of a control system of an embodiment of a gyro compass in accordance with this invention.

The control system shown in FIG. 1 is illustrated in another form as a circuitry block diagram as shown in FIG. 2. Referring to FIG. 2, blocks drawn by continuous lines represent respective circuits, and blocks drawn by dotted lines represent operations of the gyro compass performed due to controls or external forces (a vector component of the rate of the Earth's rotation about the true vertical. a vector component of the rate of the Earth's rotation about the north/south horizontal).

Referring to FIG. 2. "20" represents a vector component of the rate of the Earth's rotation about the north/south horizontal ($\omega \cos \phi$), and "21" represents a state (1/s : inteqration element) in which the component of the rate of the Earth's rotation about the north/south horizontal is being integrated with time. "22" shows that an amount of precession of "1/H" is provided vertically ($\beta$ direction) in response to torques exerted by the servo motor 6 about the vertical axis of the rotor. Similarly, "23" shows that an amount of precession of "1/H" is provided in an east/west direction ($\alpha$ direction) in response to torques applied by the torquer 4 about the horizontal axis of the rotor. "24" represents a vector component of the rate of the Earth's rotation about the true vertical ($107 \sin \phi$). "25" represents the total values of a vector component of the rate of the Earth's rotation about the true vertical and torques exerted by the torquer 4 about the horizontal axis are integrated to give a deviation angle in an east/west direction. "26" represents an initial bearing in which the north seeking end of the axis of the rotor points.

In the same figure, "Kt" in a bock 6' represents gain in relation to torques applied about the vertical axis; "Ki" represents gain of the attenuator 10; and "Kp" represents gain of the torquer driving circuit 13.

With the control system arranged as in the foregoing, when the switch 17 is turned to a tap "3" thereof at the third stage, an inclination angle "βs" stored in the equilibrium inclination angle storing means 15 is given to the follow-up servo system of the servo motor 6 as an error signal so that an inclination angle of the rotor becomes coincident with an inclination angle of the rotor in the steady state.

Next, some embodiments of the equilibrium inclination angle storing means will be shown.

Figure 3:
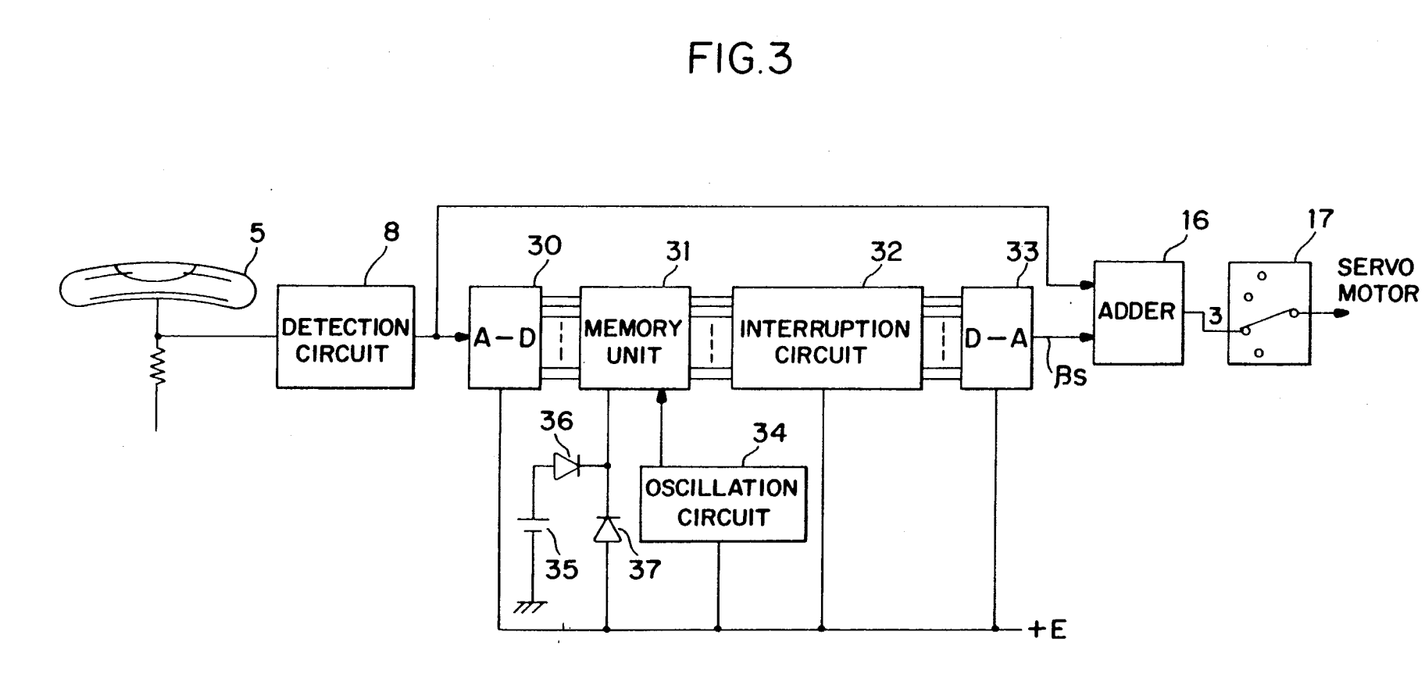

FIG. 3 shows a circuit corresponding to the equilibrium tilt angle storing means and other circuits connected thereto.

In FIG. 3, "5" represents an inclinometer using an electrolyte. The detection circuit 8 produces voltage signals dependent on tilt angles of the rotor. An AD-converter 30 converts output signals of the detection circuit 8 into digital data. An oscillation circuit 34 produces timing signals at constant periods, and a memory unit 31 stores output data produced by the AD-converter 30 at time instants at which the timing signals are generated, thereby refreshing a stabilized tilt angle of the rotor. The memory unit 31 is normally supplied with electric power from a power source line +E through a diode 37. But, when power supply from the power source +E is interrupted, electric power is supplied from a battery 35 through a diode 36. An interruption circuit 32 is in a conduction state when electric power is supplied from the power source +E and produces data once stored in the memory unit 31. A DA-converter 33 converts the input data to analog voltage signals and supplies the adder 16 with the resultant signals as the equilibrium tilt angle "βs"

The embodiment shown in FIG. 3 operates in the following way. Firstly, at the fourth stage, i.e., in a normal operation, electric power is supplied to the respective circuits from the power source +E. The oscillation circuit 34 produces timing signals at constant periods to the memory unit 31, thereby causing the memory unit 31 to refresh the tilt angle of the rotor in response to each timing signal. If, for example, a ship provided with a gyro compass comes to anchor thereafter and the power source for the gyro compass is turned off, the other circuits including the oscillation circuit 34 stop to operate. But, only the memory unit 31 is supplied with electric power from the battery through the diode 36, thereby maintaining the data in the memory unit 31. Thus, there will be maintained in the memory unit 31 the last tilt angle data picked up after the ship comes to anchor and just before the power source is turned off. It should be noted that the voltage level of the back-up battery 35 is a little lower than the voltage level of the power source +E used in a normal condition, and thus the electric power of the battery 35 is not consumed in a normal condition of operation. Since electric power consumed by the memory unit 31 is very little, accompanied by the function of the interruption circuit 32, the battery 35 is required to produce little electric power. Accordingly, a tilt angle of the rotor in the equilibrium state is correctly stored up to a time instant at which the gyro compass is switched on at a later time. After the gyro compass is switched to the power source, signals representing a tilt angle data "$\beta s$" are produced from the DA-converter 33. As a result, it is directly controlled so that the tilt angle of the rotor is made coincident with a precise tilt angle thereof in the equilibrium state at the third stage as explained in the foregoing.

With the construction of an embodiment shown in FIG. 3, a memory unit having an interruption circuit is used in place of the memory unit 31 and the interruption circuit 32. Although, with the embodiment shown in FIG. 3, a tilt angle of the rotor is refreshed in response to each of the timing signals produced at constant periods by the oscillation circuit 34, a manual switch can be incorporated in place of the oscillation circuit 34 and the tilt angle can be picked up and stored by operating the manual switch just before the gyro compass is stopped. Also, a signal generator can be incorporated which produces timing signals for storing tilt angle data in response to a detection thereby of a slight voltage decrease of the power source ,E at an instant when the gyro compass is halted. Also, a digital comparator can be used, in place of the adder 16, for directly comparing output data of the a/D-converter 30 with output data of the memory unit 31, without using the D/A-converter 33.

Figure 4:
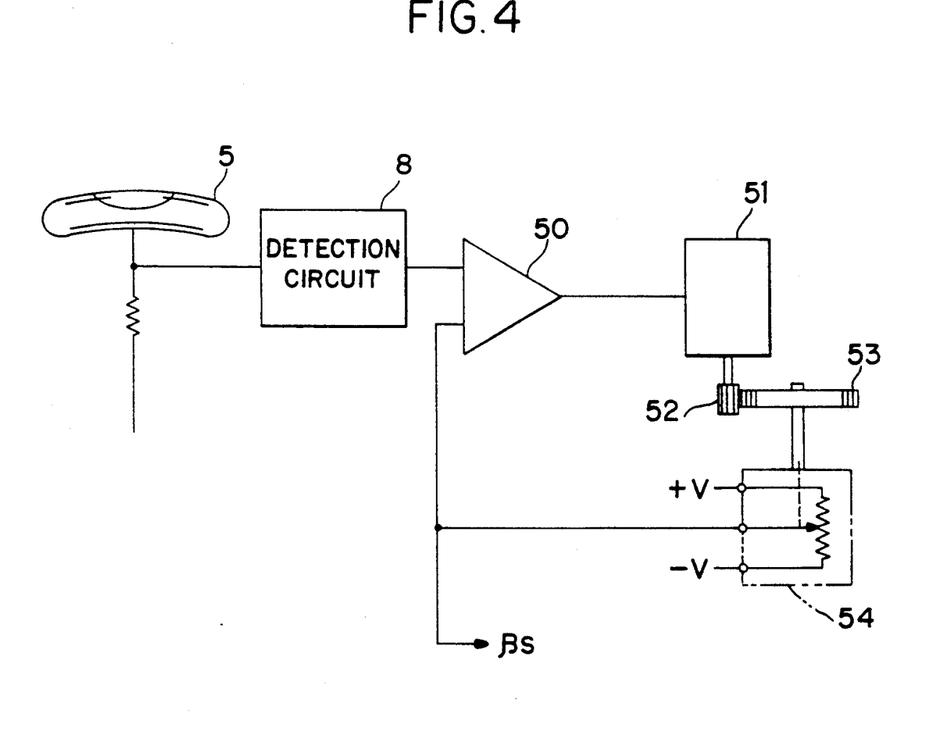

It is also possible to store tilt angles of the rotor in an analog memory device. An example of the analog memory device is shown in FIG. 4. Referring to FIG. 4, "50", "51" and "54" represent a differential amplifying circuit, a motor and a potentiometer respectively. The potentiometer 54 is driven to rotate by the motor 51 through gears 52 and 53. The potentiometer 54 is supplied with reference voltages +V and −V and feeds voltage signals picked up by a slider back to the differential amplifying circuit 50. Since this control system is a servo system, the servo motor 51 rotates in a manner that a voltage value picked up by the sider of the potentiometer 54 becomes the same as an output voltage value of the detection circuit 8 i.e., a voltage value corresponding to the tilt angle of the rotor. If it is constructed and controlled in a manner that the motor 51 rotates extremely slowly and rotates very little, even if a tilt angle of the rotor is large, during one to two hours after the gyro compass is started to be driven, a voltage value picked up by the sider of the potentiometer becomes, in the meanwhile, the same as a voltage value corresponding to a tilt angle in the equilibrium state. When the gyro compass is disconnected from the power source thereafter, the motor 51 does not rotate and hence the potentiometer 54 mechanically will store a tilt angle of the rotor in the steady state. When the power source is connected to the gyro compass thereafter, a voltage value picked up by the slider of the potentiometer 54 can be used as a signal "$\beta s$" representing the tilt angle in the equilibrium state at the third stage.

It is also possible to construct the control system of the gyro compass with a micro computer. An embodiment using a micro-computer in accordance with the present invention is shown in FIG. 5.

Figure 5:
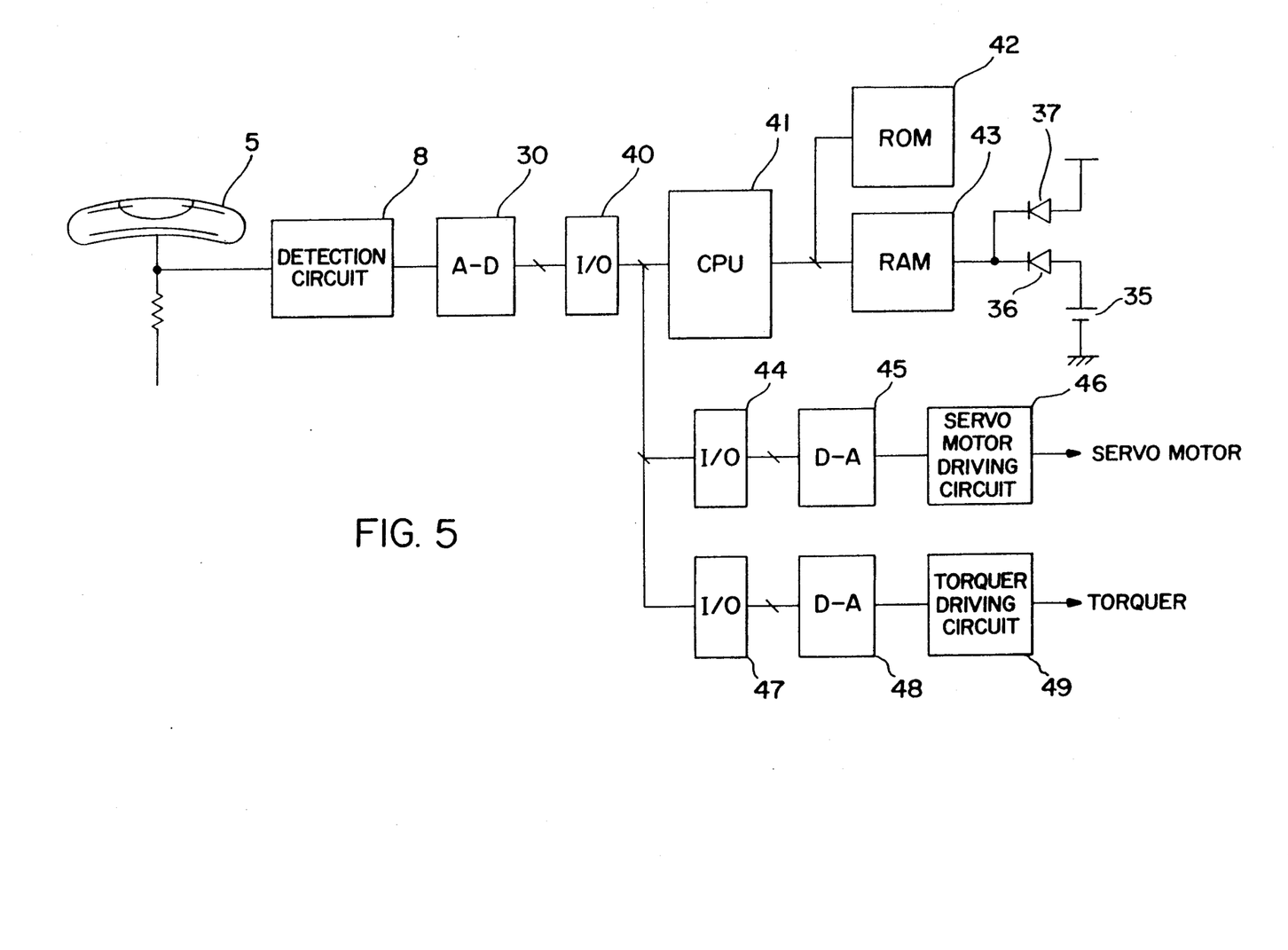

Referring to FIG. 5, "41" represents a CPU for performing digital computation; "42" represents a ROM for storing process programs for operating the CPU; and "43" represents a RAM which is used as a working area in performing various computations and has an area for storing data representing an equilibrium tilt angle of the rotor. The RAM 43 is supplied with electric power through the diode 37 in a normal operation mode, while it is supplied with electric power from the battery 35 through the diode 36 during the gyro compass is not in operation. The detection circuit 8 detects output signals of the tiltmeter 5 to produce voltage signals corresponding to a tilt angle of the rotor. The A/D-converter 30 converts the voltage signals to digital signals. The CPU 41 takes into the digital signals representing a tilt angle of the rotor through an I/0 port 40 at timing instants as desired and performs arithmetic operations corresponding to various stages shown in FIG. 2. Data corresponding to output torques of the servo motor are produced and supplied to an I/0 port 44. A DA-converter 45 converts the data signals applied at the input terminal thereof to analog signals which are supplied to a servo motor driving circuit 46. The servo motor driving circuit 46 drives the servo motor 6 in response to the input voltage signals. The CPU 41 supplies an /0 port 47 with data representative of torques which ar to be produced by the torquer 4. The Da-converter 48 converts the data signals to analog signals which are supplied to a torquer driving circuit 49. The torquer driving circuit 49 drives the torquer 4 in response to voltage signals supplied to the torquer driving circuit 49.

With the construction of the embodiment according to the present invention shown in FIG. 5, the CPU 41 writes data signals representing a tilt angle of the rotor into a predetermined area of the RAM 43 at constant periods or just before the gyro compass is disconnected from the power source at the third stage. Thereafter, the CPU uses the stored data signals as data representative of a tilt angle of the rotor in the equilibrium state at the third stage after the gyro compass is re-driven.

The present invention is capable of producing effects as in the following:

(1) Since an equilibrium tilt angle of the rotor is dependent also on effects due to imperfectness of mechanical adjustments of a gyro compass and this tit angle is used at the third stage when the gyro compass is re-started, it is brought to a steady state in a shorter time at the third stage.

(2) Even if, for example, a ship goes from a cold northern district down to a tropical district, and a gyro compass is exposed to temperature variations to vary slightly the center of gravitation of the gyroscope, the gyro compass is provided with an optimum tilt angle of the rotor in the steady state when it is redriven.

(3) Conventionally, as an auxiliary means for providing a tilt angle of a rotor, there have been necessary navigational aid apparatii such as a loran receiver for producing latitude information or some means for manually setting a latitude read by an operator from a chart or the like. The present invention makes these apparatii and devices unnecessary.

We claim:

1. A gyro compass comprising:
    a tiltmeter for detecting a tilt of a horizontal spin axis of a rotor with respect to Earth's surface;
    horizontal axis torque applying means for exerting a torque about a horizontal axis of the rotor;
    vertical axis torque applying means for exerting a torque about a vertical axis of the rotor;
    automatic rotor raising control means for raising the rotor to a horizontal plane in response to said vertical axis torque 2. A gyro compass comprising:
    a tiltmeter for detecting a tilt of a horizontal spin axis of a rotor with respect to Earth's surface;
    horizontal axis torque applying means for exerting a torque about a horizontal axis of the rotor;
    vertical axis torque applying means for exerting a torque about a vertical axis of the rotor;
    automatic rotor raising control means for raising the rotor to a horizontal plane in response to said vertical axis torque applying means during a first stage after the rotor is started to rotate;
    short-time settlement controlling means for settling the rotor in a short time by obtaining an angular tilt velocity based on output signals of said tiltmeter produced at a second stage and for controlling said horizontal axis torque applying means and said vertical axis torque applying means in correspondence to the angular tilt velocity;
    equilibrium tilt angle storing means for storing an inclination angle of the rotor at a time when said gyro compass is in an equilibrium state; and
    tilt adjustment controlling means for utilizing the stored inclination angle, upon reinitiation of said gyro compass, to bring said gyro compass to said equilibrium state.

3. The gyro compass as claimed in claim 2 wherein said equilibrium tilt angle storing means comprises a memory device for storing digital signals representative of the stored inclination angle.

4. The gyro compass as claimed in claim 3 wherein said equilibrium tilt angle storing means further comprises writing means for writing the digital signals into said memory device before the gyro compass is halted.

5. The gyro compass as claimed in claim 2 wherein said equilibrium tilt angle storing means comprises a memory device for storing digital signals representative of the stored inclination angle and writing means for writing the digital signals into said memory device before the gyro compass is halted.

6. The gyro compass as claimed in claim 2 wherein a microprocessor is used to control said horizontal axis torque applying means.

7. The gyro compass as claimed in claim 2 wherein a microprocessor is used to control said vertical axis torque applying means.

8. A device for adjusting a tilt angle of a rotor of a gyro compass comprising:
    equilibrium tilt angle storing means for storing an inclination angle of the rotor at a time when said gyro compass is in an equilibrium state and
    tilt adjustment control means, operatively connected to said equilibrium tilt angle storing means, for utilizing the stored inclination angle, upon reinitiation of said gyro compass, to bring said gyro compass to said equilibrium state.

9. The device of claim 8 wherein said equilibrium tilt angle storing means comprises a memory device for storing digital signals representative of the stored inclination angle.

10. The device of claim 9 wherein said equilibrium tilt angle storing means further comprises writing means for writing the digital signals into said memory device before the gyro compass is halted.

11. The device of claim 8 wherein said equilibrium tilt angle storing means comprises a memory device for storing digital signals representative of the stored inclination angle and writing means for writing the digital signals into said memory device before the gyro compass is halted.

12. A method for adjusting a tilt angle of a rotor of a gyro compass comprising the steps of:
    (a) storing an inclination angle of the rotor at a time when said gyro compass is in an equilibrium state; and
    (b) utilizing the stored inclination angle, upon reinitiation of said gyro compass, to bring said gyro compass to said equilibrium state.

13. The method as claimed in claim 12 wherein said step (a) stores digital signals representative of the stored inclination angle.

14. The method as claimed in claim 12 wherein said step (a) comprises the steps of:
    (a1) receiving digital signals representative of the stored inclination angle; and
    (a2) writing the digital signals into a memory before operations of the gyro compass is terminated.

* * * * *